(12) United States Patent
Cuervo

(10) Patent No.: US 7,676,559 B2
(45) Date of Patent: Mar. 9, 2010

(54) REAL-TIME POLICY EVALUATION MECHANISM

(75) Inventor: Fernando Cuervo, Ottawa (CA)

(73) Assignee: Alcatel Lucent, Paris (FR)

( * ) Notice: Subject to any disclaimer, the term of this patent is extended or adjusted under 35 U.S.C. 154(b) by 1216 days.

(21) Appl. No.: 10/601,627

(22) Filed: Jun. 24, 2003

(65) Prior Publication Data

US 2004/0267865 A1 Dec. 30, 2004

(51) Int. Cl.
*G06F 15/173* (2006.01)

(52) U.S. Cl. .......................... 709/223; 709/224

(58) Field of Classification Search ............ None
See application file for complete search history.

(56) References Cited

U.S. PATENT DOCUMENTS

| | | | | |
|---|---|---|---|---|
| 5,696,486 | A * | 12/1997 | Poliquin et al. | 709/224 |
| 5,777,549 | A * | 7/1998 | Arrowsmith et al. | 709/224 |
| 5,889,953 | A * | 3/1999 | Thebaut et al. | 709/224 |
| 6,057,757 | A * | 5/2000 | Arrowsmith et al. | 709/224 |
| 6,064,304 | A * | 5/2000 | Arrowsmith et al. | 709/224 |
| 6,373,383 | B1 * | 4/2002 | Arrowsmith et al. | 709/224 |
| 6,502,131 | B1 * | 12/2002 | Vaid et al. | 709/224 |
| 6,587,876 | B1 * | 7/2003 | Mahon et al. | 709/224 |
| 6,603,396 | B2 * | 8/2003 | Lewis et al. | 709/224 |
| 6,816,903 | B1 * | 11/2004 | Rakoshitz et al. | 709/226 |
| 6,920,494 | B2 * | 7/2005 | Heitman et al. | 709/224 |
| 6,954,790 | B2 * | 10/2005 | Forslow | 709/227 |
| 6,985,901 | B1 * | 1/2006 | Sachse et al. | 709/224 |
| 7,143,153 | B1 * | 11/2006 | Black et al. | 709/224 |
| 7,213,068 | B1 * | 5/2007 | Kohli et al. | 709/224 |

* cited by examiner

*Primary Examiner*—Vivek Srivastava
*Assistant Examiner*—Jeffrey R Swearingen
(74) *Attorney, Agent, or Firm*—Kramer & Amado, PC

(57) ABSTRACT

An apparatus and methods for real-time policy evaluation in support of network management and service provisioning are presented. The apparatus includes a policy repository, a scheduler, a triggering module, a pre-computation module. A policy equivalency class association is determined for each policy-managed entity, policy, policy-managed information flow of information and/or any part of a communication network. Policy conditions are divided into triggering and passive conditions. The scheduler prioritizes policy evaluation for policies associated with passive conditions for entire policy equivalency classes applicable to large numbers of policy-managed entities. Real-time events and updates are trapped via triggering conditions and related policy evaluation is performed for the entire policy equivalency class, for a large number of policy-managed entities, in real-time. A policy decision distribution mechanism provides policy-managed entities with policy decisions for enforcement. Policy evaluation includes changing the association of a policy-managed device with a group of policy equivalency classes. Advantages are derived from real-time policy evaluation of policies related to entire policy equivalency classes, each policy equivalency class being associated with large numbers of policy-managed entities.

19 Claims, 2 Drawing Sheets

REAL-TIME POLICY EVALUATION MECHANISM

FIELD OF THE INVENTION

The invention relates to policy-based communications network management and service provisioning, and in particular to the problem of dynamically evaluating policy decisions in a communications network in real-time.

BACKGROUND OF THE INVENTION

Currently, in the communications industry, policy-based communications network management is employed in a "pre-provisioned mode" in accordance with which: all conditions for policy evaluation are pre-determined, and corresponding pre-computed policy decisions are stored in a policy repository such as, but not limited to, a directory and/or a database. However, there is a need to provide services and/or to perform policy-based communications network management employing real-time policy evaluation. For example, real-time policy evaluation is needed to enforce policies controlling dynamic network behavior related to resource utilization state changes and/or signaling events in providing dynamic policy-based communications network management and service provisioning.

The benefits of policy-based communications network management and service provisioning are most apparent when policy-based communications network management and/or service provisioning is applied to large numbers of policy-managed entities. However, when policy-based communications network management and/or service provisioning are to be performed in real-time; acquiring all relevant information, tracking events in real-time, and evaluating each separate associated policy condition in a timely and efficient manner; remains a major challenge.

In accordance with a prior art policy evaluation implementation 100 schematically presented in FIG. 1, a database 150, highly customized schemas 151, and abstraction layers are employed to hide implementation complexities of the database technology used.

Exemplary policy events, and changes to policy-managed communications network entity states are kept track of in the database 150. Prior art policy evaluation is implemented using database queries serviced via stored policy procedures 158 and database triggering techniques. The database 150 is updated upon receiving a policy event 112 and/or receiving a network state update 112. The database triggers employed to implement a particular policy related response, generate a sequence of specific queries used to determine the set of policy decisions 156 to be applied to policy-managed entities 160 in the associated communications network.

In view of the above described policy management technique it is difficult to devise and implement efficient real-time policy evaluation suitable for dynamic decision making in support of real-time policy-based communications network management and/or service provisioning, since the overall dynamics of large numbers of policy-managed entities 160 can be influenced, at any given time, by one or both of:

policy events/state updates 112 that affect large numbers of policy-managed entities 160; and individual actions by users interacting with policy-managed entities 160, or actions affecting users within a short period of time, which may be correlated or uncorrelated (e.g., denial of service attacks).

Known prior art implementations typically suffer from limitations which include:

In employing real-time databases 150 for policy storage, the schema 151 employed becomes very hard to maintain because database technologies lack a flexibility in resolving arbitrary queries in an efficient manner. To overcome this obstacle, prior art implementations employ pre-determined schemas 151 and caching strategies to perform certain specific operations. The use of predetermined schemas 151 and the caching techniques, leads to overly involved development efforts for any required change in updating policies and the associated database triggering. Typically as each particular database-technology-based implementation progresses and evolves, the policy evaluation performance becomes very unpredictable because the schema 151 tends to evolve in a manner that does not satisfactorily support policy decision resolution. In accordance with prior art techniques, costly redevelopment and redeployment of the subject application may be the only solution to alleviate this shortcoming; and If database triggering is employed on several policy servers 120 which need to cooperate when conditions for policy evaluation apply to different policy domains, the use of the database 150 in servicing each policy event/network state update 112 leads to an inefficient use of critical resources. More specifically, it leads to waste of storage resources in caching interim policy related content that is predicted to be necessary to subsequent computations, and it also leads to intensive messaging between policy servers 120, and related policy-managed entities 160, to make up for the lack of predefined database stored procedures for policy enforcement of policies having cross-domain relevance. The situation arises because the database schema, caching strategies, and stored procedures are not adequately coordinated with decision processes that detect the policy event/network state updates 112 as a cause for triggering an immediate policy (re)evaluation. For instance, consider N different policy groups, where each policy group is being specified in a record in the database 150. If each policy group is to be evaluated upon the occurrence of a network state update 112 in an uncoordinated manner, there would be at least N separate evaluations, not all being able to take advantage of cached decisions made. In accordance with the prior art, cross-domain subject applications may have to be implemented on a single policy server 120 dedicated to the subject application, however such a solution, besides encountering problems related to the ownership of the policy server 120 especially if each domain falls under the management of a different service provider, suffers from an inability to service all policy-managed entities 160 concurrently. Such a solution would be inefficient, as typically only a small number of policy-managed entities 160 cross domain boundaries at any time.

It is further desirable that a policy server 120, involved in policy evaluation, be capable not only of evaluating policies in real-time but also be capable to distribute policy decisions in a correct and timely manner to a large number of policy-managed entities 160.

There therefore is a need to solve the above mentioned issues in providing improved methods of real-time policy evaluation.

SUMMARY OF THE INVENTION

In accordance with an aspect of the invention, a policy server is provided. The policy server includes a pre-computation module for grouping a plurality of policies having the same triggering condition and policy decision into a policy equivalency class. A scheduler initiates policy evaluation based on a received event satisfying a passive condition determining policy-managed entity membership with respect to the policy equivalency class. A triggering module monitors communication network events satisfying the triggering condition, and the triggering module initiates policy evaluation subsequent to the triggering condition being satisfied. A policy decision distribution mechanism issues the policy decision to the policy equivalency class member policy-managed entities for policy enforcement. Grouping the plurality of policies into the policy equivalency class, and associating policy-managed entities with the policy equivalency class, provides policy equivalency class restricted policy evaluation reducing policy evaluation overheads.

In accordance with another aspect of the invention, a method of policy evaluation is provided. The method includes a sequence of steps. A plurality of policies having the same triggering condition and policy decision are grouped into a policy equivalency class. Policy-managed entity membership is determined with respect to the policy equivalency class. Based on receiving an event satisfying the triggering condition, policy evaluation of the group of policies of the policy equivalency class is performed. The policy decision is distributed for policy enforcement to policy-managed entity members of the policy equivalency class. Grouping the plurality of policies into the policy equivalency class, and associating policy-managed entities with the policy equivalency class, provides policy equivalency class restricted policy evaluation reducing policy evaluation overheads.

Advantages are derived from real-time policy evaluation of policies related to entire policy equivalency classes, each policy equivalency class being associated with large numbers of policy-managed entities.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

In accordance with an exemplary embodiment of the invention, a method of policy evaluation for large numbers of policy-managed entities 260 is provided. Making reference to FIG. 2, policy evaluation efficiencies are gained through the pre-evaluation of as many policy decisions as possible, and through the observation of policy related events/network state updates 212 in real-time.

Figure 3:
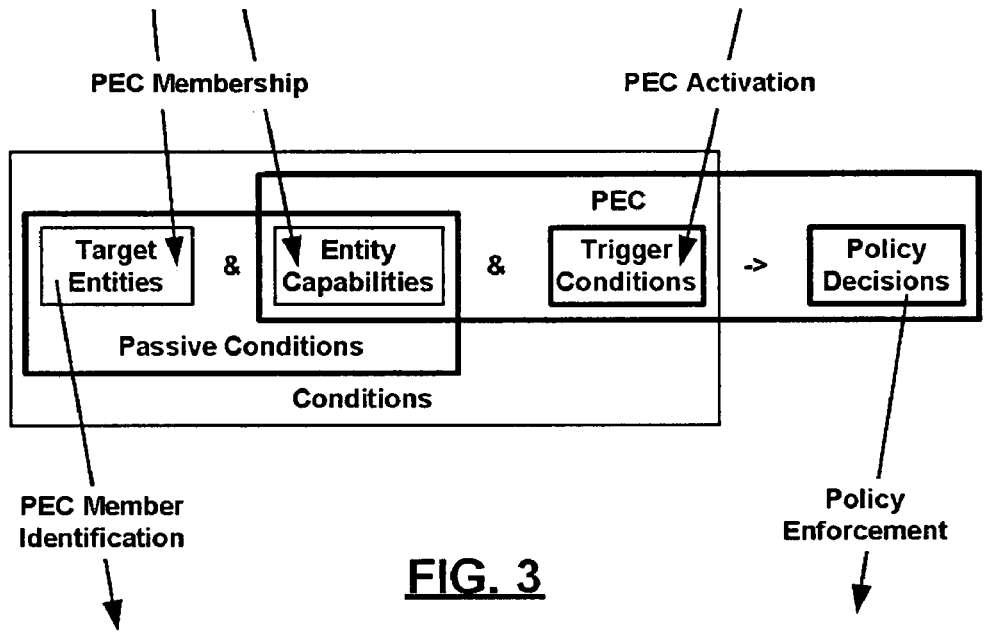
FIG. 3 is a schematic diagram showing exemplary elements of a policy specification used to provide real-time policy evaluation.

Also making reference to FIG. 3, the membership of each individual policy is determined with respect to a corresponding policy execution context, also referred to as Policy Equivalency Class (PEC), associated with a particular triggering event 212 and ensuing policy decisions 256 by specifying: policy equivalency classes, policy activation triggers, and policy equivalence class memberships. Policies 254 with the same triggering condition(s) and the same decisions(s) 256, are aggregated into a single policy equivalency class. Therefore a policy equivalency class relates a target group of policy-managed entities 260 to at least one corresponding decision 256 to be applied upon the occurrence of a triggering event that satisfies the corresponding triggering condition(s). Determining a policy equivalency class aggregate to which a: policy-managed entity, policy, policy-managed flow of information, or any other part of a communications network belongs to, may depend on several factors, such as but not limited to: time-of-day, Quality-of-Service (QoS), network address, user's service prepaid status, etc.

In accordance with the exemplary embodiment of the invention, a policy 254 specifies a set of conditions that result in one or more actions. FIG. 3 shows an exemplary condition side of a policy 254 including, but not limited to, three types of conditions: those identifying the target policy-managed entities 260 for the corresponding policy decision 256 enforcement, those identifying the capabilities of target policy-managed entities 260, and those depending on temporal or state events triggering the issuance of policy decisions 256 to the target policy-managed entities 260 with the appropriate capabilities. Trigger-based conditions, entity capability-based conditions, and actions/decisions 256 define the corresponding policy equivalency class. The target entity specific condition identifies the members of the policy equivalency class. The capability conditions (which are constantly pre-evaluated as described herein below) determine membership into the policy equivalency class. An exemplary target condition relates to the network address of a specific policy-managed entity 260: "IP_address=138.24.63.18". An exemplary capability condition relates to supported functionality of a specific policy-managed entity 260: "AUTO-NEGOTIATION=True". Passive conditions typically relate to slow changing (operational/governing) parameters, for instance, indicating whether a user subscribes to a service, or whether a user has an interest to participate in an ongoing service session. Triggering conditions, for instance, may relate to time-of-day events, resource availability, whether a user is available to participate in an ongoing service session, or any other service related event, such as, but not limited to, the broadcast source becoming available or unavailable. A triggering condition may include a logical "OR" evaluation of several events 212 reported in real-time.

When a policy event/network state update 212 satisfying a triggering condition of a policy 254 occurs, a pre-evaluated policy decision 256 corresponding to that policy 254 is activated. The triggering event (212) will cause only member policies 254 of the corresponding policy equivalence class only to be (re)evaluated thereby greatly improving policy evaluation efficiency in accordance with the presented method. Therefore the aggregation of policies 254 into policy equivalency classes provides a rapid identification of a corresponding group of policy enforcement/execution actions (decisions 256) to be undertaken subsequent to the occurrence of a corresponding triggering event.

In accordance with the exemplary embodiment of the invention, criteria and mechanisms are introduced to accelerate the computation of policy decisions including:

classifying conditions of each policy type, and of each policy equivalency class (the set of policies—regardless of type—that are to be enforced upon the occurrence of identical triggering conditions), into one triggering and typically several passive conditions;

using a policy pre-computation mechanism that:
a) aggregates, into policy equivalency classes, all policies 254 with the same triggering conditions that result in the same decisions 256, and
b) scheduling prioritized policy evaluation for policy equivalency class-related policies based on demands for the policy equivalency classes and/or available resources. The demand for a policy equivalency class could be represented by an (adjustable) priority level ascribed, for example, based on a statistical use (hits) of a given policy, or a perceived importance—an ad-hoc recognition that some evaluations are more important than others and are given a higher policy evaluation priority level;
c) continuously evaluates policies based on changes related to all passive conditions, an event triggering mechanism associated with the resolution of triggering conditions; and a scalable policy decision distribution service for distributing policy decisions to all policy-managed entities 260 of a policy equivalency class. An exemplary scalable messaging policy decision distribution service is presented in the co-pending commonly assigned U.S. patent application Ser. No. 10/434,172 entitled "Network Architecture for Message Based Policy Distribution" filed on May 9, 2003 by the same present inventor and incorporated herein by reference.

Figure 2:
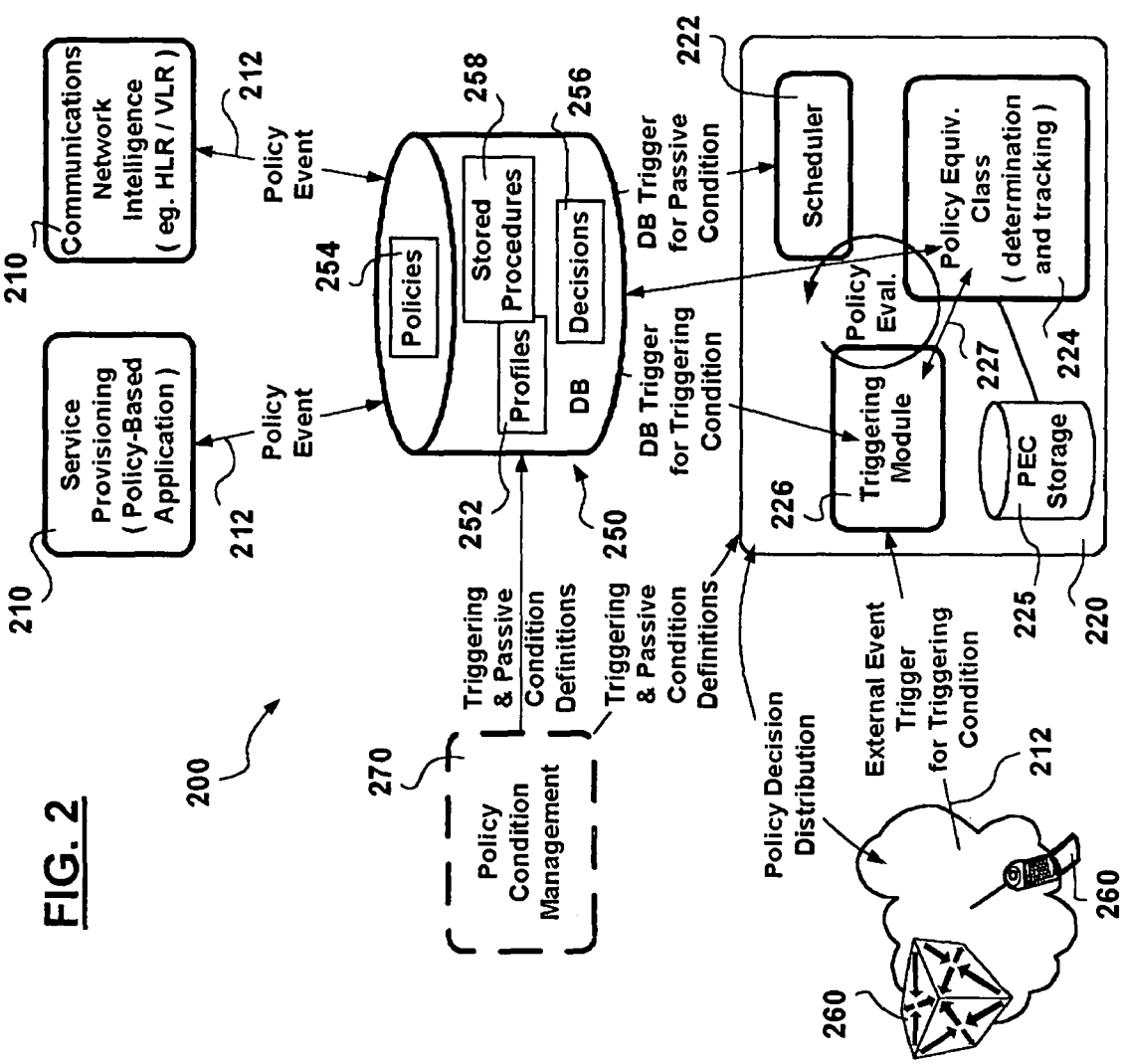
FIG. 2 is a schematic diagram showing, in accordance with an exemplary embodiment of the invention, cooperating elements providing real-time policy evaluation.
Figure 1:
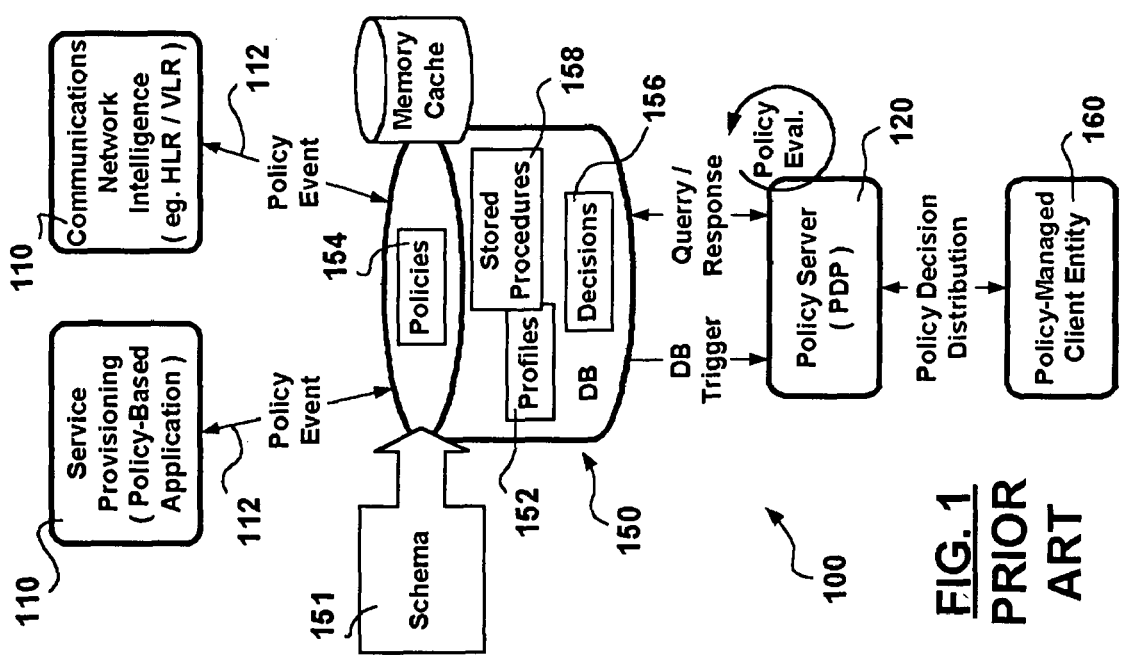
FIG. 1 is a schematic diagram showing details of a prior art implementation employed in providing pre-provisioned policy-based communications network management and/or service provisioning.

FIG. 2 is a schematic diagram showing, in accordance with an exemplary embodiment of the invention, cooperating elements providing real-time policy evaluation including:

a policy condition management mechanism 270 for manipulating (specifying/changing) triggering and passive conditions. A policy server 220 provides a policy condition management interface to configure the evaluation of policies by identifying, and explicitly separating, the policy conditions into passive and triggering conditions;

a scheduler 222 for scheduling policy evaluation with respect to passive and triggering conditions. Although in FIG. 2 the scheduler 222 is illustrated as being associated with the policy server 220, the invention is not limited to the association shown. If multiple policy servers 220 are used in a particular deployment, the scheduler 222 may be shared by all policy servers 220 and, for example, may be more appropriately collocated with the repository 250;

a pre-computation module 224 that employs the database 250 and perhaps stored procedures 258 to compute the policy equivalency classes. The pre-computation module 224 stores 225, and makes the policy equivalency class definitions available so that a policy server 220 can have immediate and fast access thereto. For example, shared memory implementations (225) may be employed without limiting the invention thereto. The pre-computation module 224 may also directly modify a policy equivalency class without access to the repository 250;

a trigger detection module 226 associated with the policy server 220 monitors triggering conditions associated 227 with each policy equivalency class. Triggering events are shown, in FIG. 2, to include changes to the information stored in the database repository 250 and network state updates/events 212 received from the communications network. A variety of triggering events may be employed without limiting the invention thereto.

The triggering module 226 associated with the policy server (policy decision point) 220 monitors the occurrence of events/updates 212. The ensuing corresponding policy decisions 256 are communicated to member policy-managed entities 260 of the associated policy equivalency class, when the event matches the triggering condition of that policy equivalency class as specified in a corresponding policy 254.

The policy evaluation scheduler 222 is used to prioritize policy evaluation with respect to passive conditions so as to minimize the overall policy processing overhead associated with triggering-condition-based policy evaluation, which further improves the policy evaluation efficiency of the presented method.

In benefiting from a policy evaluation improvement, it is important for the scheduler 222 to treat policy evaluation related to passive conditions differently from policy evaluation related to triggering conditions. For example, passive conditions may take a continuous lower priority in policy evaluation, and/or passive conditions may be arranged according to a precedence ranking. Policy equivalency class policy evaluation related to triggering conditions may take a higher priority while triggering events are relatively infrequent. As policy-managed entities 260 are members of policy equivalency classes, the decisions 526 of triggering-condition-initiated policy evaluation are efficiently applied to all policy class members.

In accordance with the exemplary embodiment of the invention, the pre-computed policy equivalency classes and the associated conditions are used to accelerate policy decision computation for a large numbers of policy-managed entities 260. The pre-computation mechanism used by module 224 may be exemplary implemented, without limiting the invention, via database triggering techniques. Policy evaluation may therefore be started by the database triggers indicating changes to conditions. The scheduler 222 prioritizes the evaluation of passive conditions. Policy evaluation includes the issuance of a series of pre-set database queries that return all defined (and active) policy equivalency classes.

Independently, the triggering mechanism 226 monitors all triggering conditions, and when a triggering condition is detected, the distribution mechanism (not shown, but described in the above mentioned co-pending and commonly assigned US patent application) ensures that each policy decision 256 arrived at, is communicated to all member policy-managed entities 260 of the policy equivalency class for policy execution and enforcement.

Figure 4:
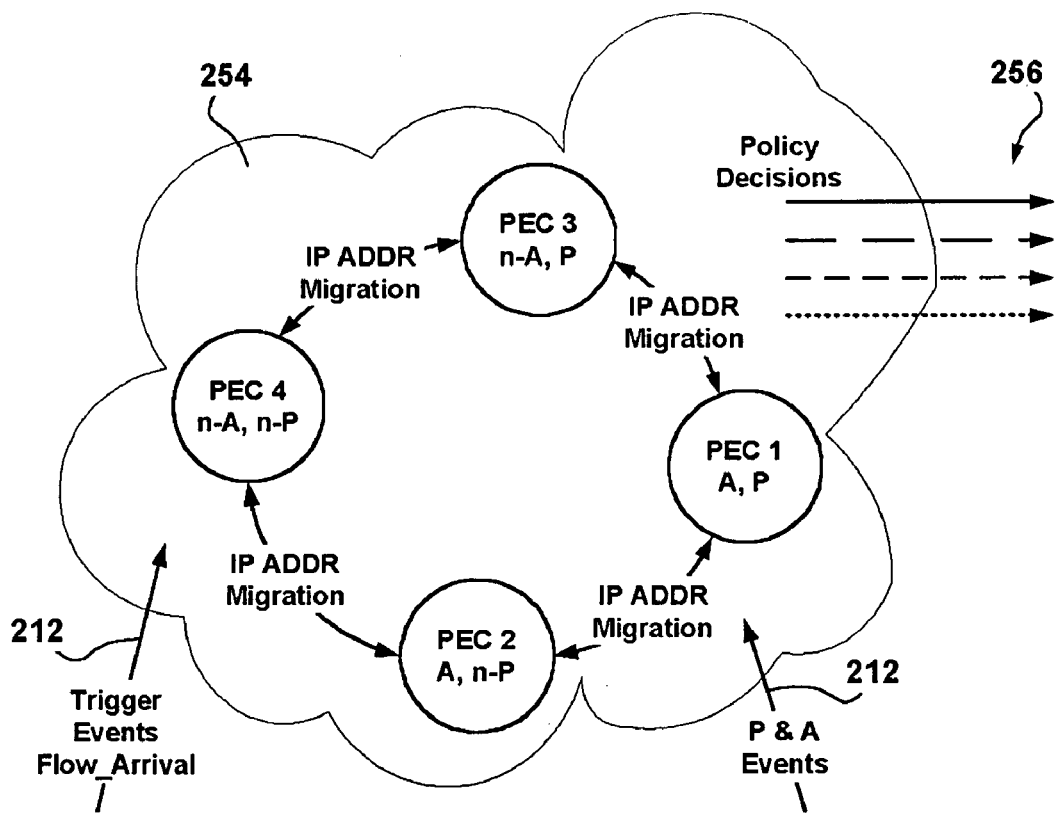
FIG. 4 is a schematic diagram showing an exemplary state diagram employed in implementing real-time policy evaluation in accordance with an exemplary implementation of the exemplary embodiment of the invention.

FIG. 4 shows an exemplary implementation of the exemplary embodiment of the invention, wherein real-time evaluation of a policy group 254 is employed to determine the behavior of a communications network upon the start of a multimedia broadcast, or flow of information, which is required to be distributed to a group of policy-managed network node entities 260 having IP addresses and further having enough prepaid service use credits (other passive conditions may apply such as, but not limited to: policy-controlled device capability conditions, flow content conditions, content encoding conditions, etc.) Given exemplary passive and triggering conditions of the policy group 254, four policy equivalency classes PEC 1 through PEC 4 are defined and shown.

It is understood that having an IP address assigned may have different interpretations depending on the access technology used. If the access technology permanently ascribes a particular IP address to a policy-managed entity 260, the particular IP address may be used as station identification. If IP addresses are assigned to policy-managed entities 260 on demand during network connectivity activation such as by using Dynamic Host Configuration Protocol (DHCP) IP address assign and DHCP IP address release; the assignment of ad-hoc IP addressing may be used to signify that the corresponding policy-managed entities 260 are on-line and active. Both interpretations may be used to establish policy-managed entity associativity with corresponding policy equivalence classes.

Consider the exemplary case in which the presence of IP addressing is used for policy-managed entity 260 identification in a target condition. PEC 1 aggregates all IP addresses said to have pre-paid credits and available to receive content. PEC 2 aggregates all available IP addresses without available pre-paid credits. PEC 3 aggregates all unavailable pre-paid IP addresses. And, PEC 4 aggregates all unavailable and non-pre-paid IP addresses.

It is important to point out that in accordance with the exemplary embodiment of the invention, the passive condition (re)evaluation and/or perhaps the (re)evaluation of a triggering condition, may result in the migration of a policy-managed entity 260 to another policy equivalence class. Upon becoming a new member of a different policy equivalency class, the policy-managed entity 260 may have to synchronize its state. Methods for state synchronization are described in the above mentioned co-pending commonly assigned US patent application.

On-going pre-evaluation (224) occurs upon detection of IP address presence in the communication network or changes 212 to the prepaid status. As a result, as IP address associativity to the policy equivalency classes changes through the 4 possible policy equivalency classes, policy equivalency class membership changes. Upon the receipt of the triggering event (212), (i.e. the flow of information to be distributed) the pre-computed membership lists are used to initiate the real-time distribution of the flow content to users associated with the member policy-managed entities 260 that are associated with the policy equivalency class 1. For policy equivalency class 3 and policy equivalency class 4, real-time policy evaluation is not required since the IP addresses are not available for the policy equivalency class members, which is a clear beneficial example of a policy evaluation overhead reduction. A recharge notification (256) may be issued to policy-managed entities 260 of policy equivalency class 2. A missed call/conference/broadcast is recorded (256) for each policy-managed entity 260 of policy equivalency class 3. And, a recharge notification (256) is queued to be issued to member policy-managed entities 260 associated with policy equivalency class 4.

In accordance with the exemplary embodiment of the invention, policy evaluation acceleration in reaching policy decisions 256 for a large groups of policy-managed entities 260 is achieved. With the above described improvements, when a triggering condition occurs, it can be expected that the aggregate of target policy-managed entities 260 and the corresponding policy decision 256 be ready for distribution.

In accordance with the exemplary embodiment of the invention, the efficiency of the policy evaluation is maintained even when schemas become sub-optimal due to modifications and extensions that are necessary to adapt thereof to network management changes, service changes and service evolution. Efficiency is retained because policy evaluation efficiency is measured as the time lag between each triggering event and the completion of corresponding policy evaluation, unless the database structure has become so inconsistent with the needs of the policy-based implementation that the policy equivalency class pre-computation becomes lengthier than the interval between triggering events.

In accordance with the exemplary embodiment of the invention, efficient use of the database repository 250 is made to resolve the impact of passive conditions by scheduling policy evaluation with respect to policy equivalency classes according to priorities. In evaluating policies related to passive conditions, evaluation priority can be determined by the expected 'interarrival times' of triggering events. This decreases the lag time between triggering events 212 and computation.

In accordance with the exemplary embodiment of the invention, a mechanism performing policy evaluations independent as much as possible from the internal organization of the database repository 250 is therefore provided. The lessened dependence on the internal organization of the policy database repository 250 and coordination with various decision processes associated with various policy decisions provides improved real-time policy evaluation efficiency.

If each member of the policy equivalency class requires a customized instance of the policy decision 256, then these can be pre-computed with respect to the policy equivalency class. In this case the advantages of the invention are amplified as the real-time requirement of the policy evaluation is increased.

The value of the efficient real-time policy evaluation performed in accordance with the exemplary embodiment of the invention, increases as policy-based management and service provisioning are enabled with means for migrating policy evaluation from the "provisioned mode" to more dynamic applications. Policy-based implementations in accordance with which a high degree of aggregation into policy equivalency classes is likely to occur, such as mobile, wireless and other access applications, would benefit the most from the presented approach.

The embodiments presented are exemplary only and persons skilled in the art would appreciate that variations to the above described embodiments may be made without departing from the spirit of the invention. The scope of the invention is solely defined by the appended claims.

I claim:

1. A policy server in a communications network, the policy server comprising:
 a pre-computation module that identifies and explicitly separates a plurality of policy conditions into passive conditions and triggering conditions, groups a plurality of policies having an identical triggering condition that results in an identical policy decision into a policy equivalency class, continuously evaluates said policies based on changes in said passive conditions, and schedules a prioritized evaluation based on at least one of demand and resources;
 a scheduler that initiates said prioritized evaluation for said passive conditions and said triggering conditions, uses received events satisfying said passive conditions to determine policy-managed entity memberships with respect to the policy equivalency class, prioritizes the evaluation of the policy equivalency class based on demand for the policy equivalency class and available resources, and arranges said passive conditions according to a precedence ranking and assigns a higher priority to said policy equivalency class when said policy equivalency class is related to one of said triggering conditions;
 a triggering module that monitors all of said triggering conditions, wherein the triggering condition that corresponds to said policy equivalency class causes only member policies in said policy equivalency class to be reevaluated;

a policy decision distribution mechanism that issues the policy decision upon detection of the triggering condition corresponding to the policy equivalency class being satisfied, distributes the policy decision to the policy equivalency class, and enforces policies for policy-managed entities that are members of said policy equivalent class; and a policy repository that stores the plurality of policies and the policy decision.

2. The policy server claimed in claim 1, the policy server being associated with a network management system providing support of one of policy-based network management, and policy-based service provisioning.

3. The policy server claimed in claim 1, wherein the policy repository further comprises:

one of a database and a directory.

4. The policy server claimed in claim 1, wherein the policy repository further comprises:

a policy condition management interface providing interaction with one of the policies and policy conditions.

5. The policy server claimed in claim 1, the policy server being further associated with a policy equivalency class repository for storing policy equivalency class specifications.

6. The policy server claimed in claim 1, further comprising:

a policy condition management interface providing interaction with one of the policies and policy conditions.

7. The policy server of claim 1, wherein the policy equivalency class aggregates Internet Protocol (IP) addresses based upon whether credits are prepaid and whether the IP addresses are available to receive content.

8. A method of policy evaluation comprising:

grouping a plurality of policies having an identical triggering condition that results in an identical policy decision into a policy equivalency class;

identifying and explicitly separating a plurality of policy conditions into passive conditions and triggering conditions;

determining policy-managed entity membership with respect to the policy equivalency class;

receiving an event satisfying the triggering condition that corresponds to said policy equivalency class;

distributing the policy decision corresponding to said triggering condition for policy enforcement to policy-managed entity members of the policy equivalency class, wherein policies of the policy equivalency class resulting in said policy decision are:

continuously evaluating said policy decision based on changes related to said passive conditions;

scheduling prioritized policy evaluation for policy decisions that correspond to said policy equivalent class based on demands for said policy equivalent class or available resources, arranging said passive conditions according to a precedence ranking;

assigning a higher priority to the policy equivalency class when said policy equivalency class is related to one of said triggering conditions; and monitoring all of said triggering conditions, wherein the triggering condition that corresponds to said policy equivalency class causes only member policies in said policy equivalency class to be reevaluated.

9. The method as claimed in claim 8, the method further comprising:

changing a corresponding policy-managed entity's membership with respect to the policy equivalence class for said triggering condition.

10. The method as claimed in claim 8, the method further comprising:

monitoring events in a communications network.

11. The method as claimed in claim 8, the method further comprising:

changing a corresponding policy-managed entity's membership with respect to the policy equivalence class for said passive conditions.

12. The method as claimed in claim 8, the method further comprising:

prioritizing passive condition related policy evaluation based on a demand for one of a policy and the policy equivalency class.

13. The method as claimed in claim 12, further comprising:

determining a demand for the one of the policy and the policy equivalency class based on a previous utilization frequency.

14. The method as claimed in claim 8, further comprising: specifying a policy condition.

15. The method as claimed in claim 14, the method further comprising:

designating the policy condition as either one of said triggering conditions or said passive conditions.

16. The method as claimed in claim 15, the method further comprising:

specifying one of a time-of-day event, a quality-of-service event, a source available event, a source unavailable event, a broadcast start event, and an information flow available event to be monitored as one of said triggering conditions.

17. The method as claimed in claim 16, the method further comprising:

logically combining events when identifying said triggering conditions.

18. The method as claimed in claim 15, the method further comprising:

specifying one of a prepaid status event, a policy-managed entity on-line event, a policy-managed entity off-line event, a policy-managed entity capability, and a policy-managed entity interest in a service when identifying said passive conditions.

19. The method of claim 8, wherein the policy equivalency class aggregates Internet Protocol (IP) addresses based upon whether credits are prep aid and whether the IP addresses are available to receive content.

* * * * *